March 25, 1930.  A. GAUTHIER  1,751,808
PHOTOGRAPHIC LENS SHUTTER
Filed Jan. 30, 1929
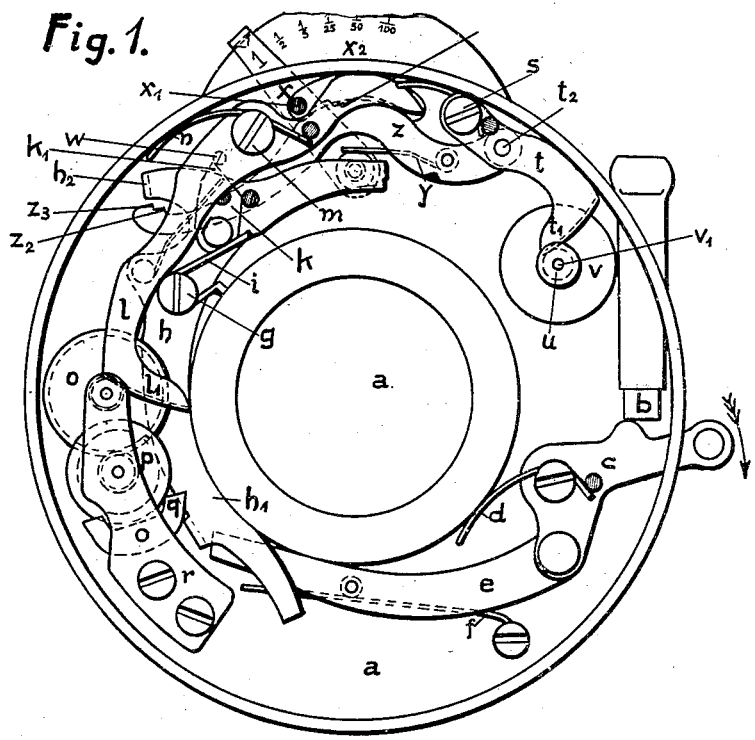
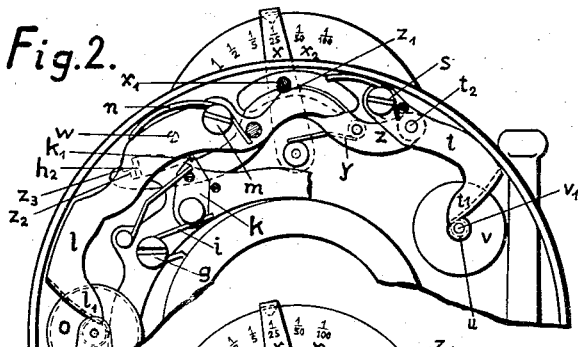
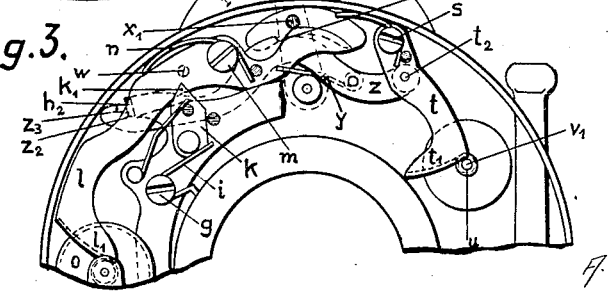
A. Gauthier
INVENTOR Patented Mar. 25, 1930

1,751,808

UNITED STATES PATENT OFFICE

ALFRED GAUTHIER, OF CALMBACH-ON-THE-ENZ, GERMANY

PHOTOGRAPHIC LENS SHUTTER

Application filed January 30, 1929, Serial No. 336,191, and in Germany June 4, 1927.

In photographic lens shutters with toothed wheel retarding means, in order to extend the range of action of the retarding means for the running down motion of the shutter the toothed wheel retarding mechanism has been provided with an additional retarding mechanism capable of being disconnected therefrom, so that for the longer instantaneous exposures the main and the additional retarding mechanism jointly and for shorter instantaneous exposures one retarding mechanism only is brought into operative association with the spring actuated driving mechanism of the shutter during its running down motion. The actuation of the two retarding mechanisms from the spring operated driving mechanism and the regulation from the adjusting means is in each instance a joint one and the two retarding mechanisms thus are in an interdependent relationship, so that the effective range of the separate retarding mechanisms cannot be graduated in the degree required for accurately regulating the shutter speeds and adapted to the requirements of the spring actuated operating mechanism. A further disadvantage is that with such an arrangement a relatively complicated operating mechanism is required.

The object of the present invention is to provide a lens shutter in which for retarding the speed of the shutter two separate retarding mechanisms are so arranged that they can be brought into engagement separately and independently of one another. A further feature of the retarding arrangement consists in this that each retarding mechanism is regulated from the adjusting means unaffected by the other retarding mechanism.

The invention as applied to a so-called automatic shutter is shown by way of example in the accompanying drawing.

Fig. 1 shows a constructional example applied to a lens shutter with the iris diaphragm part removed and the exposed driving mechanism in the run-down condition of the shutter and set to a slow speed (1 second).

Fig. 2 shows the shutter set before being released and set to 1/25 of a second.

Fig. 3 also shows the shutter set to a speed of 1/25 of a second but after it has run down.

$a$ is the shutter casing which contains arranged in a circle in its interior space surrounding the aperture $a^1$ the usual parts for releasing the shutter, viz: the piston $b$, the cam lever $c$ with the spring $d$, the pawl $e$ and the spring $f$. Pivoted on the screw $g$ is the main operating lever $h$ which is controlled by the spring $i$. Pivoted on the screw $m$ is the toothed segment lever $l$ which is in engagement with the retarding mechanism $o, p, q, r$ and which has its toothed end $l_1$ held by means of its spring $n$ against the inside of the wall of the casing $a$. According to the invention, besides the retarding mechanism $l$—$r$ a separate retarding mechanism is provided, which consists of the lever $t$ pivoted on a screw $s$ and which also bears teeth on its free end $t^1$ which mesh with the pinion $u$ which pinion is connected in a suitable manner with the inertia member $v$ and is capable of rotating together with the latter about the pin $v^1$. Pivoted in the pin $t^2$ is a hook $z$ which is pressed by means of a spring $y$ against the pin $x^1$.

The shutter operates in the following manner: Through the finger being pressed on the lever $c$ in the direction of the arrow, the main operating lever $h$ is rotated by the pawl $e$ pressing against the right-angled projection $h^1$ on the lever $h$ in opposition to the pressure of the spring $i$, until the position shown in Fig. 2 is reached, whereupon the pawl $e$ slides off the projection $h^1$ and releases the lever $h$. The latter snaps back under the pressure of the spring $i$ into its inoperative position, at the same time opening the shutter blades (not shown in the drawing) which, when the lever $h$ has reached its inoperative position, return under the action of a spring into the closed position. When set to a longer period of exposure (1 second to 1/5 of a second, Fig. 1) the retarding mechanism $l$, $o$, $p$, $q$ moves into the path of action of the projection $k^1$ on the yielding pawl $k$ and retards the motion of the lever $h$ in a known manner, when the shutter blades are in the open position, in accordance with the adjustment of the lever $x$ by means of the pin $x^1$ and the scale $x^2$. With a retardation of the shutter of less duration (for instance when the index lever $x$ is set to 1/25 of a second), the retarding mechanism $l$, $o$, $p$, $q$ is removed from the path of action of the pawl $k$ (Fig. 2). At the same time the pin $x^1$ will have moved into the position opposite the recess $z^1$ in the hook $z$, so that the projection $z^2$ on the hook $z$, on the lever $h$ being stressed, engages behind the bent over flat part $h^2$ of the lever $h$ and during the running down motion imparts motion to the hook $z$, the lever $t$ and the retarding mechanism $u$, $v$, by which means the shutter is retarded only for a short duration corresponding to the setting of the scale $x^2$. For still higher speed (1/50 of a second) the hook $z$ is moved by the spring $y$ only so far into the path of motion of $h^2$ that during the running down motion of the lever $h$ it is carried along by the projection $z^3$, whereby the lever $t$ is caused to swing through only about half the length of the toothed portion $t^1$. When the shutter is set for still higher speeds, the two retarding mechanisms are both brought out of engagement with the lever $h$.

The invention makes it possible accurately to adapt the resistance of each single retarding mechanism independently of the other retarding mechanism in accordance with the instantaneous speeds required and the power of the spring of the operating means of the shutter, although the construction of the shutter is very simple.

What I claim is:

1. A photographic lens shutter comprising in combination spring actuated operating means, two toothed wheel retarding mechanisms, and means for bringing the said retarding mechanisms separately and independently into operative association with the said operating means as and for the purpose set forth.

2. A photographic lens shutter comprising in combination spring actuated operating means, two toothed wheel retarding mechanisms capable of offering a different retarding resistance, and means for bringing the said retarding mechanisms separately and independently into operative association with the said operating means as and for the purpose set forth.

3. A photographic lens shutter comprising in combination spring actuated operating means, a main operating lever, two toothed wheel retarding mechanisms each capable of offering a different retarding resistance, the retarding mechanism offering the smaller resistance being capable of coacting directly with the said main operating lever, and a yieldingly pivoted lever capable of connecting the retarding mechanism offering the greater resistance to the main operating lever during the inoperative return motion of the said retarding mechanism, as and for the purpose set forth.

4. A photographic lens shutter as claimed in claim 1, and having means for regulating the two retarding mechanisms independently of one another, as and for the purpose set forth.

In testimony whereof I have signed my name to this specification.

ALFRED GAUTHIER.